(12) United States Patent
Becker

(10) Patent No.: US 10,819,479 B2
(45) Date of Patent: Oct. 27, 2020

(54) APPLICATION OF ASYNCHRONOUS CODED MULTIPLE ACCESS (ACMA) IN A SYSTEM EMPLOYING ORTHOGONAL FREQUENCY DIVISION MULTIPLEXING (OFDM)

(71) Applicant: Neal David Becker, Frederick, MD (US)

(72) Inventor: Neal David Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/290,262

(22) Filed: Mar. 1, 2019

(65) Prior Publication Data

US 2019/0273590 A1    Sep. 5, 2019

Related U.S. Application Data

(60) Provisional application No. 62/637,870, filed on Mar. 2, 2018.

(51) Int. Cl.
*H04L 5/00* (2006.01)
*H04L 1/00* (2006.01)
(Continued)

(52) U.S. Cl.
CPC .......... *H04L 5/0044* (2013.01); *H04J 11/004* (2013.01); *H04J 13/0062* (2013.01);
(Continued)

(58) Field of Classification Search
CPC .............. H04L 5/0044; H04L 27/2605; H04L 27/2602; H04L 27/2656; H04L 27/2613;
(Continued)

(56) References Cited

U.S. PATENT DOCUMENTS 7,239,650 B2 *  7/2007  Rakib ................. H03M 13/256
                                                 348/E7.07
8,619,974 B2   12/2013  Fang et al.
(Continued)

OTHER PUBLICATIONS

Erik Dahlman, Stefan Parkvall, Johan Skold, Per Beming: "3G evolution : HSPA and LTE for mobile broadband", Jan. 1, 2007 (Jan. 1, 2007), AcademicPress, Great Britain, XP002791525, ISBN: 9780123725332 pp. 346-346.
(Continued)

*Primary Examiner* — Mohamed A Kamara
(74) *Attorney, Agent, or Firm* — Capitol City TechLaw; Jasbir Singh

(57) ABSTRACT

A User Equipment and method for transmitting a random-access radio frequency (RF) signal by applying Asynchronous Coded Multiple Access (ACMA) in a communication system employing Orthogonal Frequency Division Multiplexing (OFDM) is described. The method including: encoding an information stream as OFDM symbols using a low rate Forward Error Correction (FEC) coding suitable for Successive Interference Cancellation (SIC) to form a payload; generating a burst, including symbols, by performing an inverse fast Fourier transform on a unique word (UW) multiplexed with the payload; and synchronizing a transmission of each of the symbols of the burst with consecutive symbol-start instants. The UW includes a plurality of Zadoff-Chu (ZC) like sequences disposed in a subset of consecutive symbol-start instants of the burst. A receiver detects burst arrival by searching for consecutive ZC-like sequences. Channel state estimation can be performed by using the UW with additional ZC-like sequences in the burst.

25 Claims, 3 Drawing Sheets

(51) Int. Cl.
*H04L 7/04* (2006.01)
*H04J 13/00* (2011.01)
*H04J 11/00* (2006.01)
*H04L 27/26* (2006.01)

(52) U.S. Cl.
CPC .......... *H04L 1/0042* (2013.01); *H04L 1/0045* (2013.01); *H04L 5/0026* (2013.01); *H04L 7/048* (2013.01); *H04L 27/2602* (2013.01); *H04L 27/2605* (2013.01); *H04L 27/2613* (2013.01); *H04L 27/2656* (2013.01); *H04J 2013/0096* (2013.01)

(58) Field of Classification Search
CPC ... H04L 5/0026; H04L 1/0045; H04L 1/0042; H04L 7/048; H04J 11/004; H04J 13/0062; H04J 2013/0096
See application file for complete search history.

(56) References Cited

U.S. PATENT DOCUMENTS

| | | | |
|---|---|---|---|
| 9,461,765 B2 | 10/2016 | Eroz et al. | |
| 2010/0183102 A1* | 7/2010 | Mukai | H04L 1/005 375/341 |
| 2017/0150528 A1* | 5/2017 | Becker | H04L 1/005 |
| 2019/0141750 A1* | 5/2019 | Lee | H04W 74/0816 |

OTHER PUBLICATIONS

Hughes Network Systems: "Asynchronous Scrambled Coded Multiple Access (A-SCMA)", 3GPP Draft; R1-1704818, 3rd Generation Partnership Project (3GPP), Mobile Competence Centre ; 650, Route Des Lucioles ; F-06921 Sophia-Antipolis Cedex; France; vol. RAN WG1, No. Spokane, Washington; Apr. 3, 2017-Apr. 7, 2017 Mar. 24, 2017 (Mar. 24, 2017), XP051250573, Retrieved from the Internet: URL: http://www.3gpp.org/ftp/tsg_ran/WG1_RL1/TSGR188b/Docs/ [retrieved on Mar. 24, 2017] the whole document.

Hughes: "ACMA-OFDM and Low PAPR ACMA (SC-FDE) for Uplink NOMA", 3GPP Draft; R1-1801889, 3rd Generation Partnership Project (3GPP), Mobile Competence Centre; 650, Route Des Lucioles ; F-06921 Sophia-Antipolis Cedex; France,vol. RAN WG1, No. Athens, Greece; Feb. 26, 2018-Mar. 3, 2018 Feb. 16, 2018 (Feb. 16, 2018), XP051397047, Retrieved from the Internet: URL:http://www.3gpp.org/ftp/tsg%5Fran/WG1%5FRL1/TSGR1%5F92/Docs/ [retrieved on Feb. 16, 2018], p. 1.

"Asynchronous Scrambled Coded Multiple Access (A-SCMA)—a New High Efficiency Random Access Method," Becker et al., 2016 IEEE 84th Vehicular Technology Conference (VTC-Fall), 2016.

* cited by examiner

APPLICATION OF ASYNCHRONOUS CODED MULTIPLE ACCESS (ACMA) IN A SYSTEM EMPLOYING ORTHOGONAL FREQUENCY DIVISION MULTIPLEXING (OFDM)

CROSS REFERENCE TO RELATED APPLICATIONS

The present application claims the benefit of U.S. Provisional Application No. 62/637,870 filed Mar. 2, 2018, which is incorporated in its entirety by reference for all purposes as if fully set forth herein.

FIELD

The present teachings disclose an application of Asynchronous Coded Multiple Access (ACMA) in a system employing Orthogonal Frequency Division Multiplexing (OFDM).

BACKGROUND

In a digital communications network, multiple access schemes are employed to allow multiple user terminals to share a limited amount of bandwidth provided by the transmission medium. Commonly used access techniques assign fixed frequencies, time slots, or code sequences to individual transmitting user terminals, which are known as Frequency Division Multiple Access (FDMA), Time Division Multiple Access (TDMA) and Code Division Multiple Access (CDMA), respectively. If, however, the user terminal only needs to use the frequency or time slot intermittently, then this access method is quite inefficient.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for transmitting a random-access radio frequency (RF) signal by applying Asynchronous Coded Multiple Access (ACMA) in a communication system employing Orthogonal Frequency Division Multiplexing (OFDM), the method including: providing a reference clock defining symbol-start instants; encoding an information stream as OFDM symbols using a low rate Forward Error Correction (FEC) coding suitable for Successive Interference Cancellation (SIC) to form a payload; generating a burst, including symbols, by performing an inverse fast Fourier transform on a unique word (UW) multiplexed with the payload; and synchronizing a transmission of each of the symbols of the burst with consecutive symbol-start instants. The UW includes a plurality of Zadoff-Chu (ZC) like sequences disposed in a subset of consecutive symbol-start instants of the burst. Other embodiments of this aspect include corresponding computer systems, apparatus, and computer programs recorded on one or more computer storage devices, each configured to perform the actions of the methods.

Implementations may include one or more of the following features. The method where each of the symbols Includes T tones, each of the plurality of ZC-like sequences is based on a prime number less than or equal to T, and each of the plurality of ZC-like sequences is cyclically extended to T sequences. The method where the UW is multiplexed with the payload by disposing the UW before the payload. The method where the burst further includes a Channel State Estimation (CSE) word multiplexed with the payload, the CSE include a ZC-like sequence, and the UW and the CSE word are used for performing a channel state estimation. The method further including scrambling the payload. The method where the reference clock further defines frames, each of the frames includes a subset of symbol-start instants, the burst is disposed in one of the frames, and a count of the symbols in the burst is less than or equal to a count of the subset of symbol-start instants of a respective frame of the frames. Implementations of the described techniques may include hardware, a method or process, or computer software on a computer-accessible medium.

One general aspect includes a User Equipment (UE) to communicate a random-access RF signal by applying ACMA in a communication system employing OFDM, the UE including: a reference clock defining symbol-start instants; an encoder to encode an information stream as OFDM symbols using a low rate FEC coding suitable for SIC to form a payload; an inverse fast Fourier transform to generate a burst, including symbols, by transforming a unique word (UW) multiplexed with the payload; and a synchronizer to synchronize a transmission of each of the symbols of the burst with consecutive symbol-start instants. The UW includes a plurality of ZC-like sequences disposed in a subset of consecutive symbol-start instants of the burst. The UE further including an antenna to communicate the burst to a receiver. Other embodiments of this aspect include corresponding computer systems, apparatus, and computer programs recorded on one or more computer storage devices, each configured to perform the actions of the methods.

One general aspect includes a method for detecting a random-access burst arrival in a communication system applying ACMA employing OFDM, the method including: providing a reference clock defining symbol-start instants; receiving bursts including symbols including multiplexed ZC-like sequences and a payload; searching for ZC-like sequences at each of the symbol-start instants in the bursts; and detecting a burst arrival when symbols disposed at a subset of consecutive symbol-start instants match a UW. The symbols are OFDM symbols disposed in consecutive symbol-start instants and encoded using a low rate FEC coding suitable for SIC. In the method at least two of the bursts are at least partially concurrent. The UW includes a plurality of cyclically shifted ZC-like sequences. Each of the bursts is modulated at a common frequency over a common frequency band with a common polarization. Other embodiments of this aspect include corresponding computer systems, apparatus, and computer programs recorded on one or more computer storage devices, each configured to perform the actions of the methods.

Implementations may include one or more of the following features. The method where the plurality of cyclically shifted ZC-like sequences are coherently combinable. The method where the UW is multiplexed with the payload by disposing the UW before the payload. The method where each of the bursts further includes a CSE word multiplexed with the payload, the CSE include a ZC-like sequence, and the UW and the CSE word are used for performing a channel state estimation. The method further including descrambling the payload of at least one of the bursts. The method where the reference clock further defines frames, each of the frames includes a subset of symbol-start instants, one of the bursts is disposed in one of the frames, and a count of the symbols in the one of the bursts is less than or equal to a count of the subset of symbol-start instants of a respective frame of the frames. Implementations of the described techniques may include hardware, a method or process, or computer software on a computer-accessible medium.

One general aspect includes a base station to detect a random-access burst arrival in a communication system applying ACMA employing OFDM, the base station including: a reference clock defining symbol-start instants; a receiver to receive bursts including symbols including multiplexed ZC-like sequences and a payload; and a burst detector to search for ZC-like sequences at each of the symbol-start instants in the bursts and to detect a burst arrival when symbols disposed at a subset of consecutive symbol-start instants match a UW. The symbols are OFDM symbols disposed in consecutive symbol-start instants and encoded using a low rate FEC coding suitable for SIC. At least two of the bursts are at least partially concurrent. The UW includes a plurality of cyclically shifted ZC-like sequences. Each of the bursts is modulated at a common frequency over a common frequency band with a common polarization. The base station further including an antenna to receive the bursts from a plurality of transmitters. Other embodiments of this aspect include corresponding computer systems, apparatus, and computer programs recorded on one or more computer storage devices, each configured to perform the actions of the methods.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
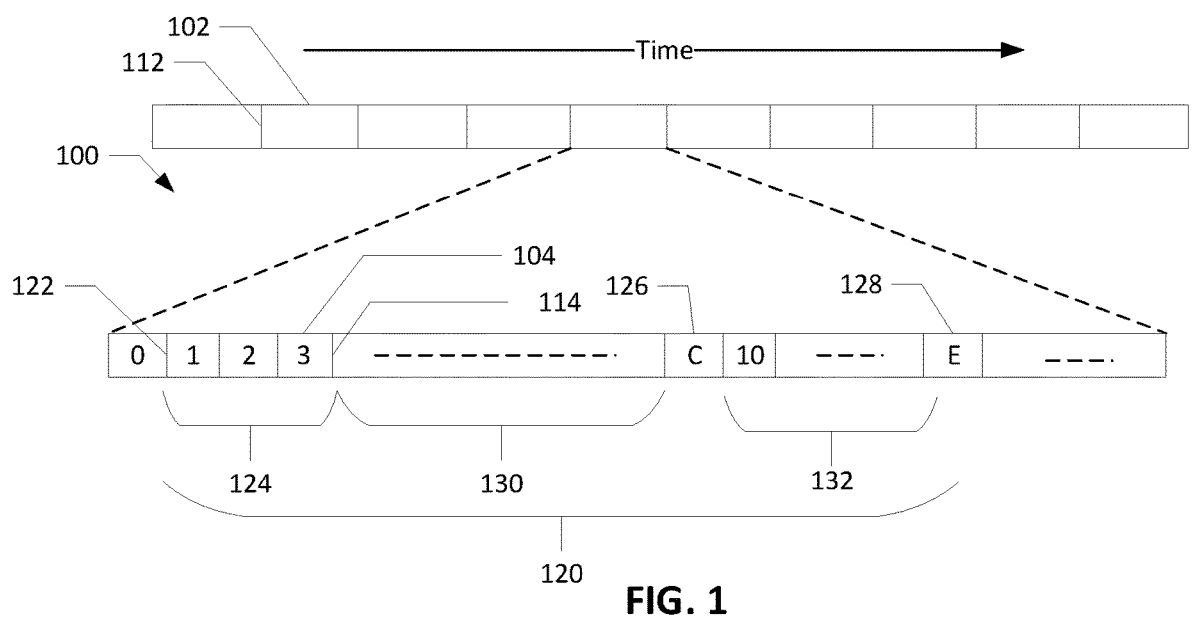
FIG. 1 illustrates an exemplary frame and symbol clock according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings improve over the art. For example, the ALOHA random access technique allows each individual terminal to transmit at will in the same frequency. When the transmissions of different terminals overlap, the transmissions "collide" and thereby become irretrievably corrupted—in which event, each of the terminals chooses a randomly selected delay for re-transmission. In a further advancement of ALOHA, the terminals line up their start of transmissions on a common time marker and keep their transmission duration the same (e.g., transmitting within time slots), in which case the chance of a collision or overlapping of the transmissions of two terminals is reduced by half. This revised access technique is known as Slotted ALOHA (S-ALOHA). To further increase the probability of transmission success, Diversity Slotted ALOHA was developed, whereby a terminal transmits multiple copies of the same information in different slots (e.g., typically, two or three copies), which reduces latency at the expense of throughput or bandwidth efficiency. In yet a further advancement, Contention Resolution Diversity Slotted ALOHA (CRDSA) was developed, whereby if receiver knows the locations of the duplicated transmissions, and if one of the duplicate transmissions is received without corruption, the information is used to cancel the other copies, which thereby increases the likelihood that transmissions from other terminals will be received without collision. If the cancellation technique is used iteratively, the capacity can be improved over S-ALOHA.

As another example, the Interleave Division Multiple Access (IDMA) is a multiple access technique where the different users share the same bandwidth, and the time slots are separated by user specific interleavers. IDMA is thus a non-orthogonal multiple access technique like random waveform Code Division Multiple Access (CDMA). While IDMA is an effective technique that trades extra receiver complexity with bandwidth and power savings, in systems where the number of users is high and the block size is large, storage of a high number of long interleavers can be inefficient and thus may be undesirable. Scrambled Coded Multiple Access (SCMA) addresses this complexity by using a single scrambling sequence with different shift factors for different users without any performance penalty. Like IDMA and random waveform CDMA, SCMA is a nonorthogonal multiple access technique. While orthogonal multiple access schemes such as TDMA or FDMA are implicitly too restrictive to achieve theoretical limits in fading channels, non-orthogonal CDMA, IDMA and SCMA have the potential of achieving such limits.

Lastly, Asynchronous Coded Multiple Access (ACMA) is an asynchronous coded multiple access technique that provides random access using low rate forward error correction (FEC) coding with successive interference cancellation (SIC). Unlike S-ALOHA, Diversity S-ALOHA, CRDSA and SCMA, ACMA assumes transmissions from different terminals are not synchronized on a timeslot basis. Removing the time slot synchronization requirement enables new applications, such as remote sensing which is essentially one-way and autonomous in nature. Moreover, instead of reducing capacity as with ALOHA, allowing fully asynchronous transmission increases the capacity in that partially overlapping bursts can be recovered by the multi-user cancellation algorithm employed by the receiver. As provided in the Institute of Electrical and Electronics Engineers (IEEE) publication, "Asynchronous Scrambled Coded Multiple Access (A-SCMA)—A New High Efficiency Random Access Method," 2016 IEEE $84^{th}$ Vehicular Technology Conference (VTC-Fall), 2016, when random access is combined with SIC, the performance (e.g., spectral efficiency) is improved when bursts arrive asynchronously, as opposed to synchronously as in, for example, S-ALOHA. This effect appears to be primarily because the times during which very high channel occupancy occur are typically shorter in the asynchronous system, and as long as some portion of the time during a burst (e.g., codeblock) the signal-to-interference (C/I) ratio is at an acceptable level, progress toward decoding convergence can be achieved. Further, since a low rate code is used, a favorable C/I on even a small portion of a burst can be useful.

When ACMA is applied in an OFDM system, however, the signals can be symbol-synchronous (since OFDM is a symbol-synchronized scheme), but the codeblocks are not synchronized. In other words, the codeblocks are not aligned with frame boundaries, and thus the codeblocks are asynchronous. This contrasts with existing OFDM designs (e.g., the Long-Term Evolution (LTE) terrestrial cellular standard). In LTE systems, the codeblocks are aligned to frame time boundaries. In the present approach, where ACMA is applied in an OFDM system, the codeblocks randomly start on any OFDM symbol. OFDM is a digital multi-carrier modulation scheme that extends the concept of single subcarrier modulation by using multiple subcarriers within the same single channel. OFDM employs many closely spaced orthogonal subcarriers that are transmitted in parallel (e.g., as opposed to transmitting a high-rate stream of data with a single subcarrier). Each subcarrier is modulated with a conventional digital modulation scheme at low symbol rate, and the combination of many subcarriers enables data rates similar to conventional single-carrier modulation schemes within equivalent bandwidths. OFDM is based on the FDM technique (where different streams of information are mapped onto separate parallel frequency channels, and each FDM channel is separated from the others by a frequency guard band to reduce interference between adjacent channels). With the OFDM scheme multiple subcarriers carry the information stream, where the subcarriers are orthogonal to each other, and a guard interval is added to each symbol to minimize the effect of the channel delay spread and inter-symbol interference. Accordingly, each OFDM symbol reflects multiple frequency instances.

In addition to the enhancement of spectral density provided by such asynchronous codeblock operation, the further benefit of a significantly expanded pool of available preamble codes for the detection of individual random-access bursts is achieved. In order to perform SIC, it is first necessary to detect the individual random-access burst arrivals and be able to distinguish them. Typically, some type of preamble code (e.g., unique word or UW) is added to the burst for this purpose. Further, in order to support a large user community and to prevent collisions between bursts from different users, it is necessary to have a large enough pool of preamble codes to select from. Herein, collision refers to two transmitters using the same UW at the same symbol-start instant. When the UW is disposed at the beginning of the burst, the collision occurs at burst start. In synchronous designs, this pool is limited and sets the upper limit on the number of simultaneous users supported, independent of any limits set by the FEC/SIC design (where FEC design may include low-rate coding and/or spreading, here noting that spreading is equivalent to repetition coding). Since the bursts are free to arrive at any symbol boundary (being symbol synchronous), rather than being constrained to start on a frame boundary (being codeblock asynchronous), the pool of preamble codes that can be distinguished is significantly expanded. This allows reliable operation at much higher values of simultaneous users, achieving significant improvement of the FEC/SIC design.

Further, in a true random-access system, burst arrivals are random (following, for example, a Poisson arrival process). In this case operation with a higher average loading (number of simultaneous users) provides even further gains, because by operating a higher loading the probability distribution of user arrivals is more compact. In other words, error performance is primarily limited by the occasions of peak users, and high peaks are less likely in a system designed to support high average loading as compared to lower loading.

FIG. 1 illustrates an exemplary frame and symbol clock according to various embodiments.

A reference clock 100 may be segmented into frames 102 along a time axis. The duration of a frame may be fixed, for example, 10 milliseconds. Each frame may have a frame-start instant 112. The frame-start instant 112 may also demark a frame-end instant for an immediately preceding frame. Each frame 102 may be segmented into symbols 104 having a symbol-start instant 114. The duration of a symbol may be fixed, for example, 0.5 milliseconds divided by N, where N is the count of symbol-start instants in the frame 102. The symbol-start instant 114 may also demark a symbol-end instant for an immediately preceding symbol. Some of the symbol-start instants may be coincident with a frame-start instant.

A burst 120 may begin at a burst-start instant 122. The burst-start instant 122 may not be coincident with a frame-start instant. In this example, the burst-start instant 122 is coincident with the second symbol-start instant 114 in the frame 102. The burst 120 may include a UW 124 disposed in consecutive symbols. In this example, the burst 120 starts with the UW 124 or in other words is disposed before a payload 130, 132. The payload 130, 132 is distributed through the burst 120 with an intervening CSE 126. Multiple CSEs may be disposed in the burst 120. The count of CSEs in the burst 120 may depend on a count of symbols in the burst 120. The count of symbols in the burst 120 may determine how many CSEs are interleaved through the payload in the burst. The burst 120 may include a last symbol 128. Each of the symbols in the burst 120 is synchronized with an immediately preceding symbol-start instant.

Preamble Design

In order to perform successful burst detection and demodulation, it is necessary to perform the two different tasks, (1) detection of burst arrival, and (2) channel estimation (e.g., determine the amplitude and phase of the signal/channel, such as in a multipath fading type of environment). In accordance with example embodiments, the two tasks of burst detection and channel estimation are performed using common waveforms, which, for example, minimizes overhead. By way of example, burst detection and channel estimation are performed using a common set of OFDM symbols or sequences. By way of further example, in order to enable detection of signal arrival or burst detection (e.g., UW preamble detection) and to facilitate channel state estimation (CSE), the provided approach employs OFDM symbols that are based on Zadoff-Chu (ZC) sequences (which are hereinafter referred to as "ZC-like sequences"). Such sequences exhibit constant amplitude in both the time and frequency domains. A constant amplitude in the time domain facilitates a low Peak-to-Average Power Ratio (PAPR) for burst detection, and a constant amplitude in the frequency domain facilitates CSE.

In accordance with further example embodiments, for enhanced detection performance, the OFDM symbols are designed to be coherently combinable. By way of example, depending on the time variation of the channel (e.g., the speed of the time variation), the symbols may be located consecutively, whereby placing them consecutively allows them to be coherently combined for improved detection performance (e.g., even with moderately time-varying channels). Whereas, with slowly time-varying channels, the symbols can instead be spaced uniformly or in some other way in time along the burst.

In accordance with certain example embodiments, therefore, allowing for moderate time variation, for example, the preamble symbols are placed as the first M symbols (which are also used for CSE). Additionally, one or more further symbols can be placed at one or more respective subsequent locations (e.g., nonconsecutive with the first M symbols), which are used for only CSE. The further symbol is inserted for CSE purposes due to the time-varying nature of the channel. As a further embodiment, the subsequent symbols may also be used to enhance burst detection, but perhaps by non-coherent combination with the other symbols (e.g., assuming the coherence time of the channel is shorter than the time spacing between symbols).

According to one example embodiment, each burst comprises 72 subcarriers (in frequency) and 14 OFDM symbols (in time). The first four symbols comprise ZC-like sequences for burst detection and CSE. Further, the ninth symbol may be another of the ZC-like sequences as in the first four symbols for CSE. Accordingly, in this example embodiment, the symbols [0,1,2,3] are used as a UW preamble for burst detection, and symbols [0,1,2,3,8] are used as reference symbols for CSE. Accordingly, the reuse of the UW symbols for CSE achieves significantly improved efficiency in design and performance.

According to such example embodiments, because ZC sequences with good properties are not available for non-prime lengths, the ZC sequences used for the preamble UW symbols and subsequent CSE symbols may be of a prime length and employed cyclically to extend to the desired non-prime length for the OFDM symbols (hence the terminology "ZC-like sequences" used herein). Since a prime-length ZC sequence is employed cyclically, the ideal properties of a true ZC sequence are diminished. The prime-length of the ZC sequence that is employed cyclically may be determined through appropriate design considerations and simulation to optimize the properties/performance. According to one such embodiment, ZC sequences of prime length 53 are cyclically extended to length 72 for the example embodiment of a 72 subcarrier OFDM symbol. Alternative embodiments, however, may be employed using cyclical extension of other prime sequence lengths. Further, in the example using a sequence length of 53, there are 52 available sequences (there are n−1 available sequences, where n is the sequence length). Further, each burst uses 5 sequences (for the symbols [0, 1, 2, 3, 8], and they are not to be reused—so, for this example embodiment, 50 of the 52 sequences are used to make up 10 different sets of 5 sequences (each sequence set comprises 5 different sequences for the symbols [0, 1, 2, 3, 8]—for example, set 1 employs sequences 1-5, set 2 employs sequences 6-10, set 3 employs sequences 11-15, etc.). Further, every cyclic/shifted permutation of each sequence set may also be used (e.g., since there is time and frequency synchronization on a symbol basis, a cyclic permutation of a sequence or sequence set would also be recognized). In this example, since there are 72 cyclic permutations, a total of 720 different sequence permutations are available (72 permutations×10 sets). Additionally, not only are 720 sequences available, but they can occur in any symbol-start position (any of the synchronized symbol-start positions). Accordingly, in this example, based on the 14 symbols per burst, any of the 720 sequences can occur in any of the 14 symbol-start positions, resulting in a total of 10,080 possibilities.

According to further example embodiments, while the foregoing example reflects a design for an OFDM carrier using 72 subcarriers, the principles can be extended to other OFDM system designs as well.

Burst transmission and reception is asynchronous as neither is dependent on a static allocation or a feedback based dynamic allocation. As such, an allocation grant-free protocol (random access) protocol may be utilized for transmission and reception.

According to further example embodiments, for burst detection, the search for the preamble sequences over the various cyclic shifts can be searched in parallel with low complexity. By way of example, a Fast Fourier Transformation may be employed to perform cyclic correlation of each of the sequences, providing the correlation outputs for all cyclic shifts in parallel.

Figure 2:
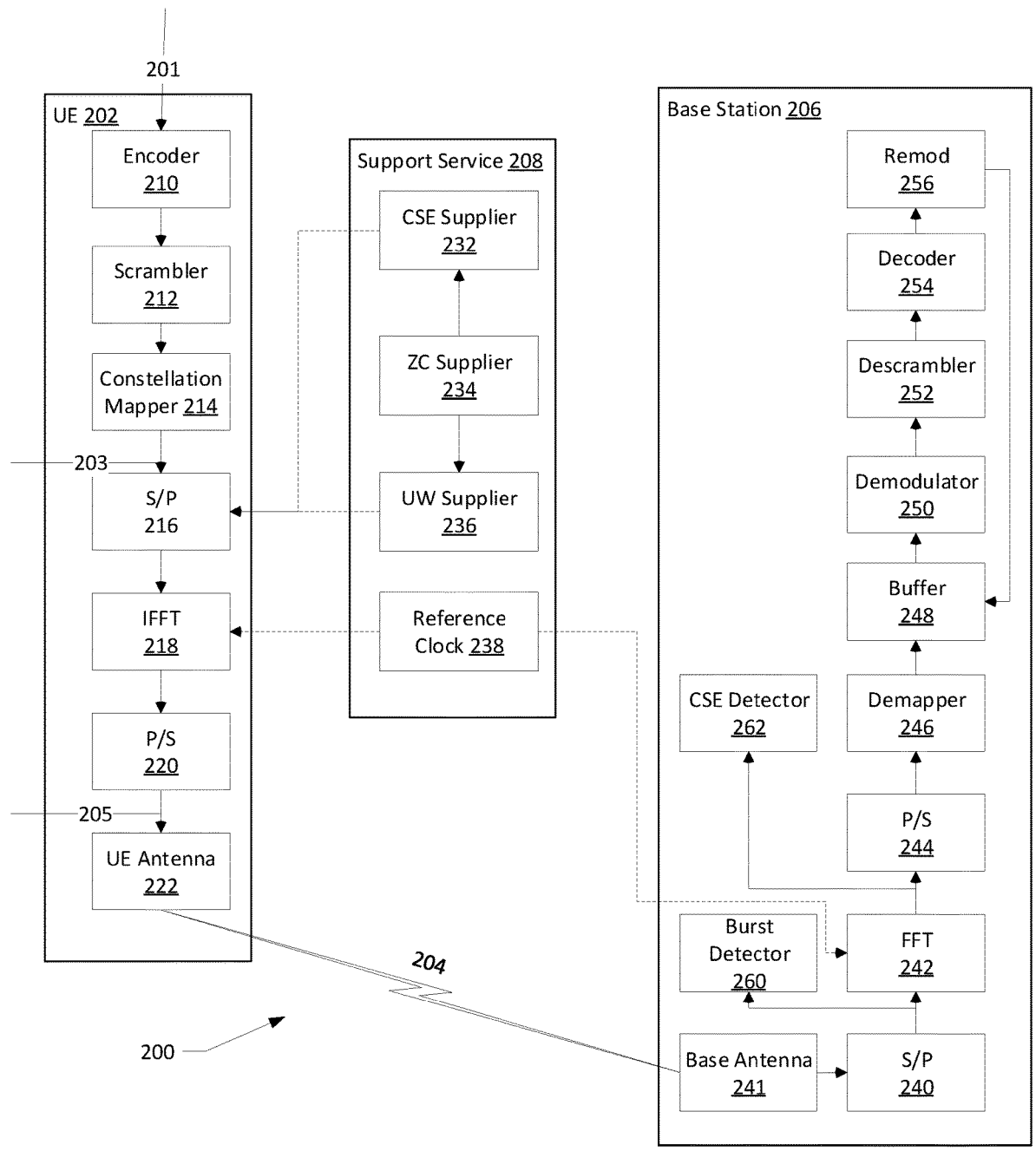
FIG. 2 illustrates a communication system applying Asynchronous Coded Multiple Access (ACMA) in employing OFDM, according to various embodiments.

FIG. 2 illustrates a communication system applying Asynchronous Coded Multiple Access (ACMA) employing OFDM, according to various embodiments.

FIG. 2 illustrates a communication system 200 applying Asynchronous Coded Multiple Access (ACMA) employing OFDM. The communication system 200 may include a User Element (UE) 202, a base station 206 and a support service 208. There may be multiple UEs 202, base stations 206 or support service 208. The UE 202 may communicate with the base station 206 via an RF signal 204.

The support service 208 may be included with the UE 202, with the base station 206 or in a separate apparatus. In some embodiments, connections between the UE 202 and the support service 208 may not be a physical connection, as illustrated by the dashed connectors. In some embodiments, connections between the base station 206 and the support service 208 may not be a physical connection, as illustrated by the dashed connectors. The support service 208 may include a ZC supplier 234 to provide a ZC-like sequence to a CSE supplier 232 or a UW supplier 236. The CSE supplier 232 and UW supplier 236 may arbitrate/manage ZC-like sequences provided to the UE 230 to be included in a burst, for example, by cyclically extending a ZC sequence, by providing a random ZC-like sequence per UE, and the like. A reference clock 238 may be provided to the base station 206 and the UE 202. Timing adjustments may be provided at the UE 202 to account to synchronize a symbol-start between the UE 202 and the base station 206. Timing adjustments may be provided at the base station 206 to account to synchronize a symbol-start between the UE 202 and the base station 206. In some embodiments, the reference clock 238 may be distributed by the base station 206.

The UE 202 may provide an information stream 201 that is encoded by encoder 210. An output of the encoder 210 may be optionally provided to a scrambler 212 for scrambling. An output of the scrambler 212 is mapped by a constellation mapper to form a payload 203. The payload 203, a UW from the UW supplier 236, and a CSE from the 232 are input to an inverse digital Fourier transform block that multiplexes/combines the inputs. The inverse digital Fourier transform block may include a serial to parallel block 216, an Inverse Fast Fourier Transform (IFFT) block 218 and a parallel to serial block 220 to form a burst 205. The burst 205 may be provided to a UE antenna 222 for transmission to the base station 206.

The base station 206 may receive the burst 205 at a base antenna 241. An output of the base antenna 241 may be presented to a digital Fourier transform block, a burst detector 260 and a CSE detector 262. The digital Fourier transform block may include a serial to parallel block 240, a Fast Fourier Transform (FFT) block 242 and a parallel to serial block 244. An output of the digital Fourier transform block may provide samples. The samples are provided, as necessary, to a demapper 246, a buffer 248, a descrambler 252, a decoder 254, and a remodulator 256 to output a received information stream.

The reference clock 238 (post any timing adjustments) is provided to the IFFT block 218 and the FFT block 242 so that symbols of the burst 205 are synchronized with symbol-start instants.

Figure 3:
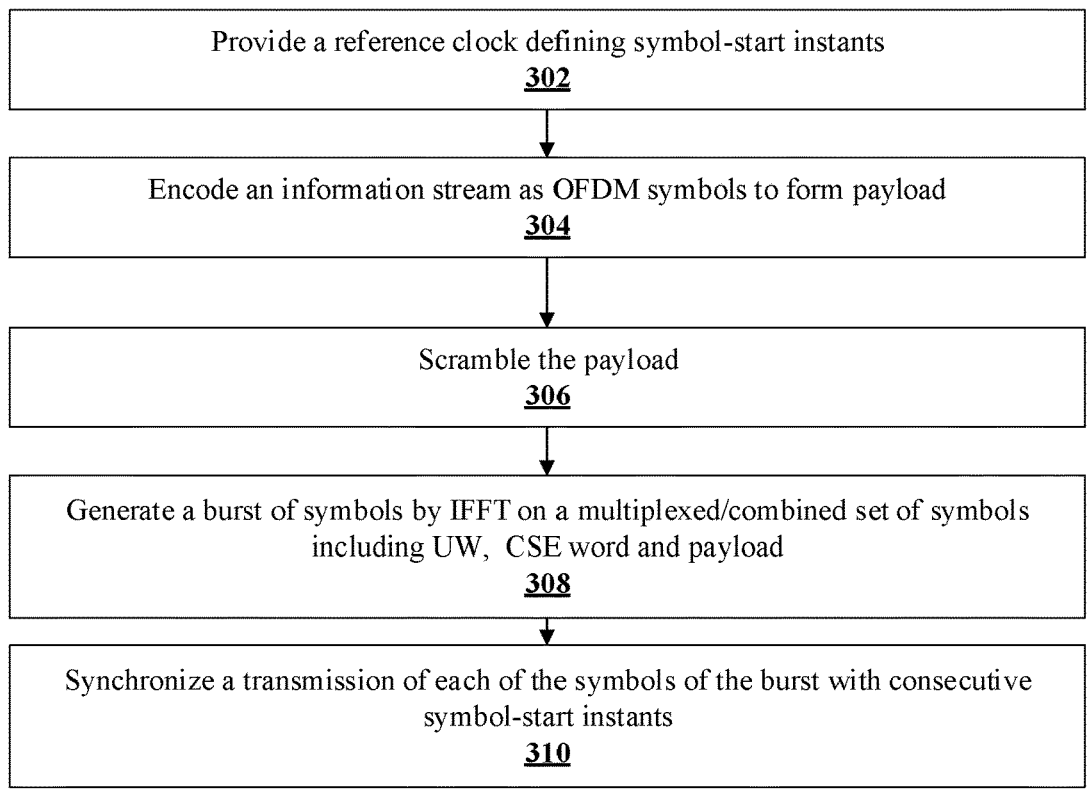
FIG. 3 illustrates a method for transmitting a random-access Radio Frequency (RF) signal by applying ACMA in a communication system employing OFDM for transmitting, according to various embodiments.

FIG. 3 illustrates a method for transmitting a random-access Radio Frequency (RF) signal by applying ACMA in a communication system employing OFDM for transmitting, according to various embodiments.

A method 300 for transmitting an RF signal is described. The method 300 may include operation 302 to provide a reference clock defining symbol-start instants. The method 300 may include operation 304 to encode an information stream as OFDM symbols to form a payload. The method 300 may include operation 306 to scramble the payload. The method 300 may include operation 308 to generate a burst of symbols by performing an inverse fast Fourier transformation on multiplexed/combined set of symbols including a UW, an optional CSE word, and the payload. the encoded information stream. The method 300 may include operation 310 to synchronize a transmission of each of the symbols of the burst with consecutive symbol-start instants.

Figure 4:
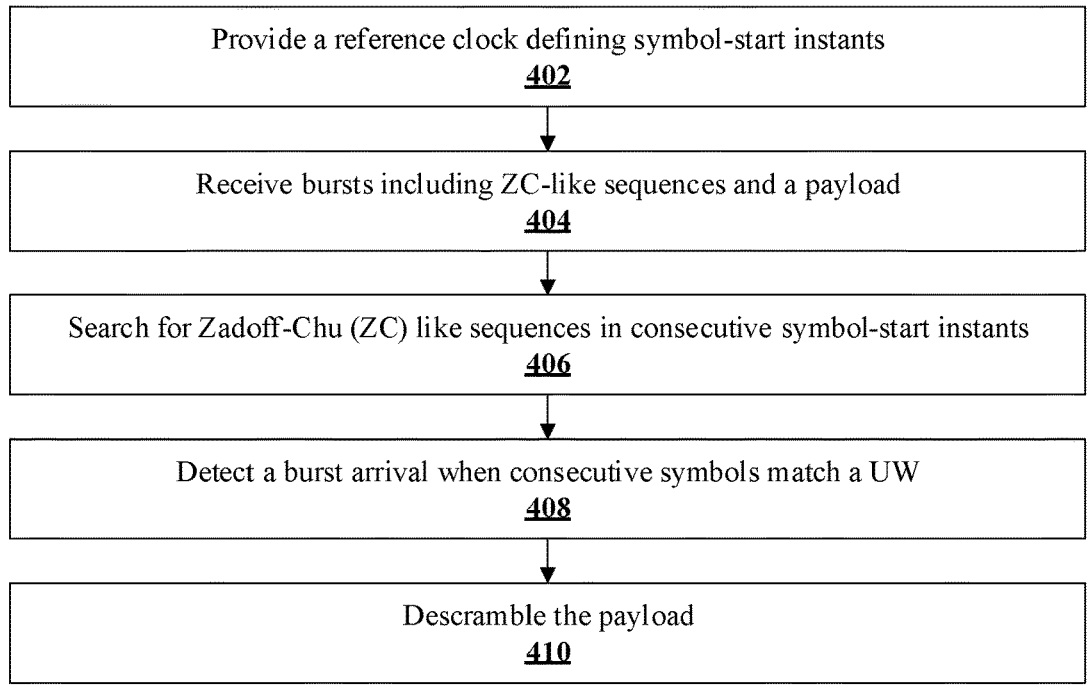
FIG. 4 illustrates a method for detecting a random-access Radio Frequency (RF) signal by applying ACMA in a communication system employing OFDM for receiving, according to various embodiments.

FIG. 4 illustrates a method for detecting a random-access Radio Frequency (RF) signal by applying ACMA in a communication system employing OFDM for receiving, according to various embodiments.

A method 400 for detecting a burst is described. The method 400 may include operation 402 to provide a reference signal defining symbol-start instants. The method 400 may include operation 404 to receive bursts including ZC-like sequences and a payload. The method 400 may include 406 to search for ZC-like sequences in consecutive symbol-start instants. The method 400 may include operation 408 to detect a burst arrival when consecutive symbols match a UW, wherein at least two of the bursts are at least partially concurrent. The method 400 may include operation 410 to descramble the payload.

Still other aspects, features, and advantages of the present invention are readily apparent from the following detailed description, simply by illustrating a few embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

I claim as my invention:

1. A method for transmitting a random-access Radio Frequency (RF) signal by applying Asynchronous Coded Multiple Access (ACMA) in a communication system employing Orthogonal Frequency Division Multiplexing (OFDM), the method comprising:
   providing a reference clock defining symbol-start instants;
   encoding an information stream as OFDM symbols using a low rate forward error correction (FEC) coding suitable for successive interference cancellation (SIC) to form a payload;
   generating a burst, comprising symbols, by performing an Inverse Fast Fourier Transform on a Unique Word (UW) multiplexed with the payload; and
   synchronizing a transmission of each of the symbols of the burst with consecutive symbol-start instants, wherein
the UW comprises a plurality of Zadoff-Chu (ZC) like sequences disposed in a subset of consecutive symbol-start instants of the burst.

2. The method of claim 1, wherein each of the symbols comprises T tones, each of the plurality of ZC-like sequences is based on a prime number less than or equal to T, and each of the plurality of ZC-like sequences is cyclically extended to T sequences.

3. The method of claim 1, wherein the UW is multiplexed with the payload by disposing the UW before the payload.

4. The method of claim 1, wherein the burst further comprises a Channel State Estimation (CSE) word multiplexed with the payload, the CSE comprise a ZC-like sequence, and the UW and the CSE word are used for performing a channel state estimation.

5. The method of claim 1, further comprising scrambling the payload.

6. The method of claim 1, wherein the reference clock further defines frames, each of the frames comprises a subset of symbol-start instants, the burst is disposed in one of the frames, and a count of the symbols in the burst is less than or equal to a count of the subset of symbol-start instants of a respective frame of the frames.

7. A user equipment (UE) to communicate a random-access Radio Frequency (RF) signal by applying Asynchronous Coded Multiple Access (ACMA) in a communication system employing Orthogonal Frequency Division Multiplexing (OFDM), the UE comprising:
a reference clock defining symbol-start instants;
an encoder to encode an information stream as OFDM symbols using a low rate forward error correction (FEC) coding suitable for successive interference cancellation (SIC) to form a payload; and
an Inverse Fast Fourier Transform block to generate a burst, comprising symbols, by transforming a Unique Word (UW) multiplexed with the payload; and
wherein
the UW comprises a plurality of Zadoff-Chu (ZC) like sequences disposed in a subset of consecutive symbol-start instants of the burst, and
a transmission of each of the symbols of the burst is synchronized with consecutive symbol-start instants of the reference clock.

8. The UE of claim 7, wherein each of the symbols comprises T tones, each of the plurality of ZC-like sequences is based on a prime number less than or equal to T, and each of the plurality of ZC-like sequences is cyclically extended to T sequences.

9. The UE of claim 7, wherein the UW is multiplexed with the payload by disposing the UW before the payload.

10. The UE of claim 7, wherein the burst further comprises a Channel State Estimation (CSE) word multiplexed with the payload, the CSE comprise a ZC-like sequence, and the UW and the CSE word are used for performing a channel state estimation.

11. The UE of claim 7, further comprising a scrambler to scramble the payload.

12. The UE of claim 7, wherein the reference clock further defines frames, each of the frames comprises a subset of symbol-start instants, the burst is disposed in one of the frames, and a count of the symbols in the burst is less than or equal to a count of the subset of symbol-start instants of a respective frame of the frames.

13. The UE of claim 7, further comprising an antenna to communicate the burst to a receiver.

14. A method for detecting a random-access burst arrival in a communication system applying Asynchronous Coded Multiple Access (ACMA) employing Orthogonal Frequency Division Multiplexing (OFDM), the method comprising:
providing a reference clock defining symbol-start instants;
receiving bursts comprising symbols comprising multiplexed Zadoff-Chu (ZC) like sequences and a payload;
searching for ZC-like sequences at each of the symbol-start instants in the bursts; and
detecting a burst arrival when symbols disposed at a subset of consecutive symbol-start instants match a unique word (UW),
wherein
the symbols are Orthogonal Frequency Division Multiplexing (OFDM) symbols disposed in consecutive symbol-start instants and encoded using a low rate forward error correction (FEC) coding suitable for successive interference cancellation (SIC),
at least two of the bursts are at least partially concurrent,
the UW comprises a plurality of cyclically shifted ZC-like sequences, and
each of the bursts is modulated at a common frequency over a common frequency band with a common polarization.

15. The method of claim 14, wherein the plurality of cyclically shifted ZC-like sequences are coherently combinable.

16. The method of claim 14, wherein the UW is multiplexed with the payload by disposing the UW before the payload.

17. The method of claim 14, wherein each of the bursts further comprises a Channel State Estimation (CSE) word multiplexed with the payload, the CSE comprise a ZC-like sequence, and the UW and the CSE word are used for performing a channel state estimation.

18. The method of claim 14, further comprising descrambling the payload of at least one of the bursts.

19. The method of claim 14, wherein the reference clock further defines frames, each of the frames comprises a subset of symbol-start instants, one of the bursts is disposed in one of the frames, and a count of the symbols in the one of the bursts is less than or equal to a count of the subset of symbol-start instants of a respective frame of the frames.

20. A base station to detect a random-access burst arrival in a communication system applying Asynchronous Coded Multiple Access (ACMA) employing Orthogonal Frequency Division Multiplexing (OFDM), the base station comprising:
a reference clock defining symbol-start instants;
a receiver to receive bursts comprising symbols comprising multiplexed Zadoff-Chu (ZC) like sequences and a payload; and
a burst detector to search for ZC-like sequences at each of the symbol-start instants in the bursts and to detect a burst arrival when symbols disposed at a subset of consecutive symbol-start instants match a unique word (UW),
wherein
the symbols are Orthogonal Frequency Division Multiplexing (OFDM) symbols disposed in consecutive symbol-start instants and encoded using a low rate forward error correction (FEC) coding suitable for successive interference cancellation (SIC),
at least two of the bursts are at least partially concurrent, the UW comprises a plurality of cyclically shifted ZC-like sequences, and each of the bursts is modulated at a common frequency over a common frequency band with a common polarization.

21. The base station of claim 20, wherein the UW is multiplexed with the payload by disposing the UW before the payload.

22. The base station of claim 20, wherein each of the bursts further comprises a Channel State Estimation (CSE) word multiplexed with the payload, the CSE comprise a ZC-like sequence, and the UW and the CSE word are used for performing a channel state estimation.

23. The base station of claim 20, further comprising a descrambler to descramble the payload of at least one of the bursts.

24. The base station of claim 20, wherein the reference clock further defines frames, each of the frames comprises a subset of symbol-start instants, one of the bursts is disposed in one of the frames, and a count of the symbols in the one of the bursts is less than or equal to a count of the subset of symbol-start instants of a respective frame of the frames.

25. The base station of claim 20, further comprising an antenna to receive the bursts from a plurality of transmitters.

* * * * *